(12) United States Patent
Bos et al.

(10) Patent No.: US 9,886,676 B1
(45) Date of Patent: Feb. 6, 2018

(54) BEHAVIOR-BASED BUSINESS RECOMMENDATIONS

(71) Applicant: LIBERTY MUTUAL INSURANCE COMPANY, Boston, MA (US)

(72) Inventors: Tracy Bos, Seattle, WA (US); Michael Hjort, Cherry Hill, NJ (US)

(73) Assignee: Liberty Mutual Insurance Company, Boston, MA (US)

( * ) Notice: Subject to any disclaimer, the term of this patent is extended or adjusted under 35 U.S.C. 154(b) by 370 days.

(21) Appl. No.: 13/801,203

(22) Filed: Mar. 13, 2013

Related U.S. Application Data

(60) Provisional application No. 61/617,983, filed on Mar. 30, 2012.

(51) Int. Cl.
    *G06Q 10/00*   (2012.01)
    *G06Q 10/06*   (2012.01)

(52) U.S. Cl.
    CPC .............. *G06Q 10/06393* (2013.01)

(58) Field of Classification Search
    CPC .............. G06Q 10/00; G06Q 30/02
    USPC ................................ 705/7.11–7.42
    See application file for complete search history.

(56) References Cited

U.S. PATENT DOCUMENTS

| | | | |
|---|---|---|---|
| 6,236,977 B1 | 5/2001 | Verba et al. | |
| 6,853,966 B2 | 2/2005 | Bushey et al. | |
| 7,406,426 B1 | 7/2008 | Pletz et al. | |
| 7,542,917 B2 * | 6/2009 | Tsai | 705/7.38 |
| 7,848,947 B1 | 12/2010 | McGloin et al. | |
| 8,589,215 B2 * | 11/2013 | Wright et al. | 705/7.42 |
| 8,650,059 B2 * | 2/2014 | Singh | G06Q 10/063 705/7.15 |
| 2002/0080950 A1 | 6/2002 | Koko et al. | |
| 2002/0091558 A1 | 7/2002 | Anderson et al. | |
| 2003/0200135 A1 | 10/2003 | Wright | |
| 2004/0138944 A1 * | 7/2004 | Whitacre et al. | 705/11 |
| 2004/0165717 A1 | 8/2004 | McIlwaine et al. | |
| 2007/0288349 A1 | 12/2007 | Chang | |
| 2009/0003583 A1 | 1/2009 | Carretto et al. | |
| 2009/0319344 A1 * | 12/2009 | Tepper et al. | 705/11 |
| 2010/0246799 A1 | 9/2010 | Lubowich et al. | |
| 2011/0173040 A1 | 7/2011 | Curtis et al. | |
| 2011/0295648 A1 * | 12/2011 | Nicholas | 705/7.29 |
| 2011/0320242 A1 * | 12/2011 | Cohen | 705/7.42 |

OTHER PUBLICATIONS

Odell, James, et al., "A Metamodel for Agents, Roles, and Groups," Agent-Oriented Software Engineering (AOSE) Lecture Notes on Computer Science LNCS 3382, 2005, pp. 78-92, Springer-Verlag, Berlin, Retrieved from <http://www-lia.deis.unibo.it/corsi/2007-2008/SMA-LS/papers/8/Odell2004.pdf> on Jun. 3, 2013.

\* cited by examiner

*Primary Examiner* — David Rines

(74) *Attorney, Agent, or Firm* — Alston & Bird LLP

(57) ABSTRACT

Computer program products, methods, systems, apparatus, and computing entities are provided for determining successful practices of insurance representatives. In one embodiment, this may include identifying one or more successful insurance representatives and determining the business practices they use that are correlated to success.

21 Claims, 4 Drawing Sheets

BEHAVIOR-BASED BUSINESS RECOMMENDATIONS

CROSS-REFERENCE TO RELATED APPLICATIONS

This application claims priority to U.S. Provisional Application No. 61/617,983, filed Mar. 30, 2012, which is hereby incorporated herein in its entirety by reference.

BACKGROUND

Many insurance carriers rely on insurance agents or agencies to promote and sell their insurance policies. It is not uncommon for a single insurance agent and/or insurance agency representative (e.g., insurance agency employee) to promote and sell insurance policies from a number of insurance carriers. The approaches used for promoting insurance policies may vary greatly from insurance representative to insurance representative. In some cases, a single insurance representative may even vary the approach to promoting insurance policies from insurance carrier to insurance carrier. In many instances, the approaches selected by an insurance agent and/or insurance agency representative (e.g., insurance agency employee) may be related to his/her preferred style of doing business. As a result, an insurance representative having a particular business style may only be interested in utilizing certain types of approaches.

It is often difficult for an insurance agent and/or insurance agency representative (e.g., insurance agency employee) to determine which approaches result in the greatest success for promoting and selling the policies of any given insurance carrier. The insurance agent and/or insurance agency representative (e.g., insurance agency employee) may further be unaware of the approaches taken by other insurance agents and/or insurance agency representatives (e.g., insurance agency employees) and the relative success of those agents/representatives or approaches. It may also be difficult for an insurance agent and/or insurance agency representative (e.g., insurance agency employee) to identify new or different approaches that may be in line with his/her preferred style of doing business.

Because an insurance carrier relies to an extent on insurance agents and/or insurance agency representatives (e.g., insurance agency employees) for promoting its products and services, an insurance carrier has an interest in increasing the success of the insurance agents and/or insurance agency representatives (e.g., insurance agency employees). Thus, there is a need in the art for methods, apparatus, systems, and computer program products for recommending tools and/or business practices to an insurance agent and/or insurance agency representative (e.g., insurance agency employee) for increasing success based at least in part on the agent's and/or representative's behavioral style.

BRIEF SUMMARY

Exemplary embodiments of the present invention provide methods, apparatus, systems, and computer program products for determining successful practices of insurance representatives.

According to one aspect, an apparatus comprising at least one processor and at least one memory including computer program code is provided. In one embodiment, the at least one memory and the computer program code may be configured to, with the processor, (1) classify one or more insurance representatives into at least one of a plurality of behavioral groups; (2) identify one or more successful insurance representatives from each of the plurality of behavioral groups based at least in part on one or more predetermined criteria; (3) determine one or more business practices used by the one or more successful insurance representatives; and (4) determine at least one of the one or more business practices used by the one or more successful insurance representatives correlated with success.

In accordance with another aspect, a method for determining successful practices of insurance representatives is provided. In one embodiment, the method comprises (1) classifying one or more insurance representatives into at least one of a plurality of behavioral groups; (2) identifying one or more successful insurance representatives from each of the plurality of behavioral groups based at least in part on one or more predetermined criteria; (3) determining one or more business practices used by the one or more successful insurance representatives; and (4) determining at least one of the one or more business practices used by the one or more successful insurance representatives correlated with success.

In accordance with yet another aspect, a computer program product comprising at least one non-transitory computer-readable medium bearing computer program code embodied therein for use with a computer is provided. The computer program code comprises (1) code for classifying one or more insurance representatives into at least one of a plurality of behavioral groups; (2) code for identifying one or more successful insurance representatives from each of the plurality of behavioral groups based at least in part on one or more predetermined criteria; (3) code for determining one or more business practices used by the one or more successful insurance representatives; and (4) code for determining at least one of the one or more business practices used by the one or more successful insurance representatives correlated with success.

BRIEF DESCRIPTION OF THE SEVERAL VIEWS OF THE DRAWING(S)

Reference will be made to the accompanying drawings, which are not necessarily drawn to scale, and wherein.

DETAILED DESCRIPTION

Figure 1:
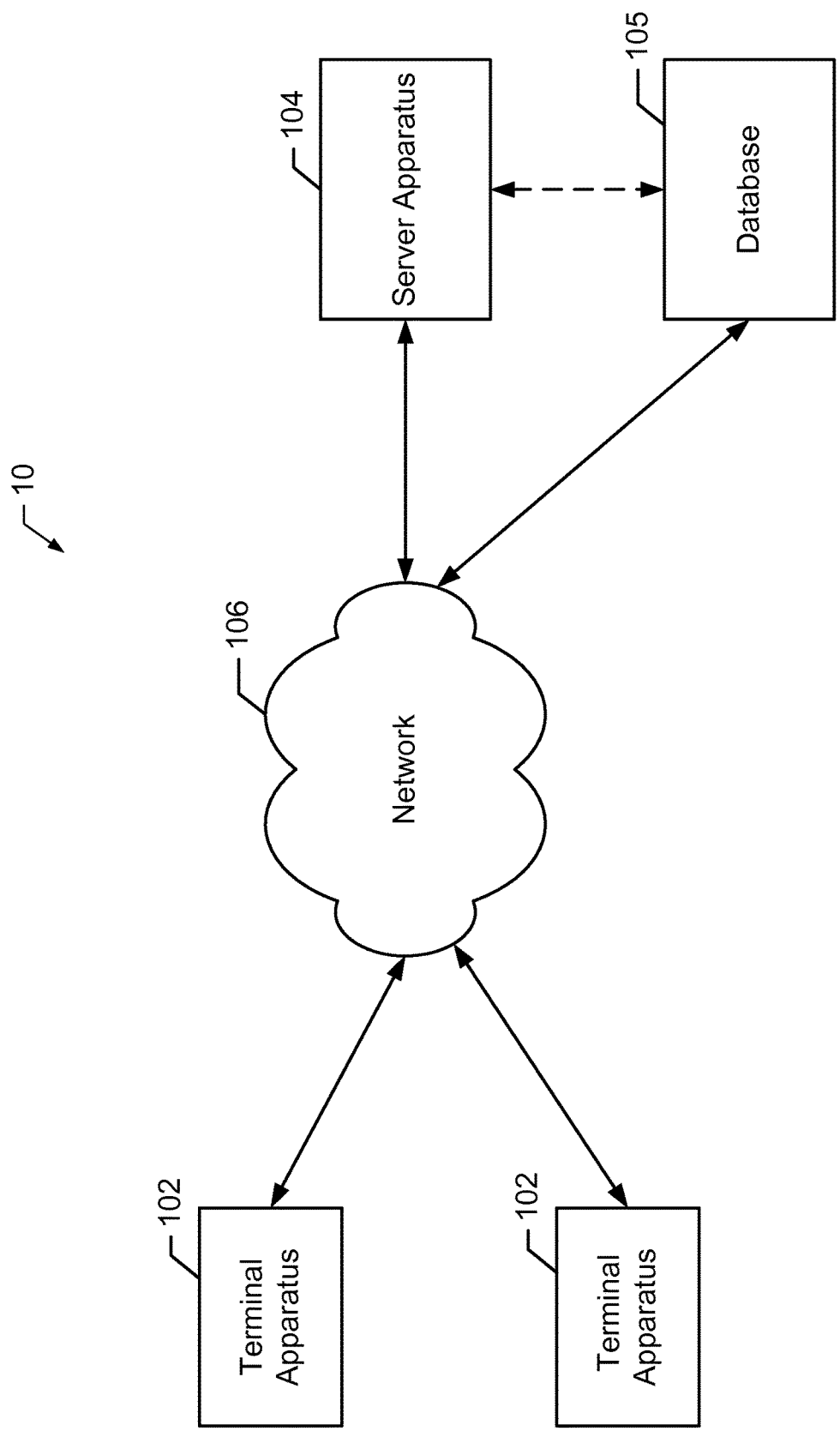
FIG. 1 is a block diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative," "exemplary," "example," and similar words are used to be examples with no indication of quality level. Like numbers refer to like elements throughout.

In an exemplary embodiment, a behavioral segmentation model may be developed for classifying insurance agents and/or insurance agency representatives (e.g., insurance agency employees). It should be noted that both insurance agents and insurance agency representatives are insurance sales persons and that both terms are used herein interchangeably. As a result, one or more behavioral groups are identified, and each of a plurality of representatives is classified into one of the behavioral groups. The tools and business practices of the representatives within each behavioral group are identified, such as by polling the representatives or monitoring their behavior. The representatives may then be evaluated to identify which representatives exhibit the greatest success based on a number of objective criteria. The success of the identified agents may then be analyzed with respect to the tools and practices they employ to determine whether any of the tools and/or practices correlates with the success of those agents/representatives.

In one embodiment, a dashboard summary may be generated and presented to a particular insurance representative. The dashboard summary may evaluate and compare the performance of the representative with other insurance representatives in the same behavioral segment. The tools and practices used by the other insurance representatives in the behavioral group may also be presented to the representative, in some cases with respect to a single insurance carrier and the tools and services it offers. Additionally, the dashboard summary may identify the tools and practices that correlate with success for an insurance representative of this behavioral type.

As a result, advantageous embodiments of the present invention seek to improve the performance and success of an insurance representatives by identifying tools and practices, in particular tools and practices that correlate with success, used by other insurance representatives having a similar behavioral style and presenting this information to the representative.

I. COMPUTER PROGRAM PRODUCTS, METHODS, AND COMPUTING ENTITIES

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium.

A computer program product may include a non-transitory computer-readable storage medium storing applications, programs, program modules, scripts, source code, program code, object code, byte code, complied code, interpreted code, machine code, executable instructions, and/or the like (also referred to herein as executable instructions, instructions for execution, program code, and/or similar terms). Any suitable computer-readable storage medium may be utilized including disks, tapes, CD-ROMs, optical storage devices, magnetic storage devices, and/or the like. For example, a computer-readable storage medium may comprise any form of random access memory (RAM), read only memory (ROM), in line memory module, cache memory, register memory, flash memory, non-volatile memory, non-transitory medium, and/or the like. It will be appreciated that where embodiments are described to use a computer-readable storage medium, other types of computer-readable storage media may be substituted for or used in addition to the computer-readable storage media described above.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY SYSTEM ARCHITECTURE

FIG. 1 provides an illustration of a system architecture that can be used in conjunction with various embodiments of the present invention. As shown in FIG. 1, the system architecture may include one or more terminal apparatus 102. For instance, the terminal apparatus 102 may be one or more computers, computing entities, computing devices, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. The system 10 may, in exemplary embodiments, comprise one or more servers 104. For instances, the servers 104 may be, for example, one or more computers, computing entities, computing devices, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein.

The system 10 of FIG. 1 may further comprise one or more databases 105, one or more networks 106, and/or the like. Each of the components of the system 10 may be in electronic communication (directly or indirectly) with one another, for example, over the same or different wireless or wired networks including, for example, a wired or wireless Personal Area Network (PAN), Local Area Network (LAN), Metropolitan Area Network (MAN), Wide Area Network (WAN), cellular network, or the like.

It should be noted that other system architectures are contemplated that may be used to practice various aspects of embodiments of the invention. Thus, the system architecture provided in FIG. 1 is for illustrative purposes only and should not be construed to limit the scope of embodiments of the invention. Further, while FIG. 1 illustrates certain system entities as separate, standalone entities, the various embodiments are not limited to this particular architecture.

a. Exemplary Terminal Apparatus

Figure 2:
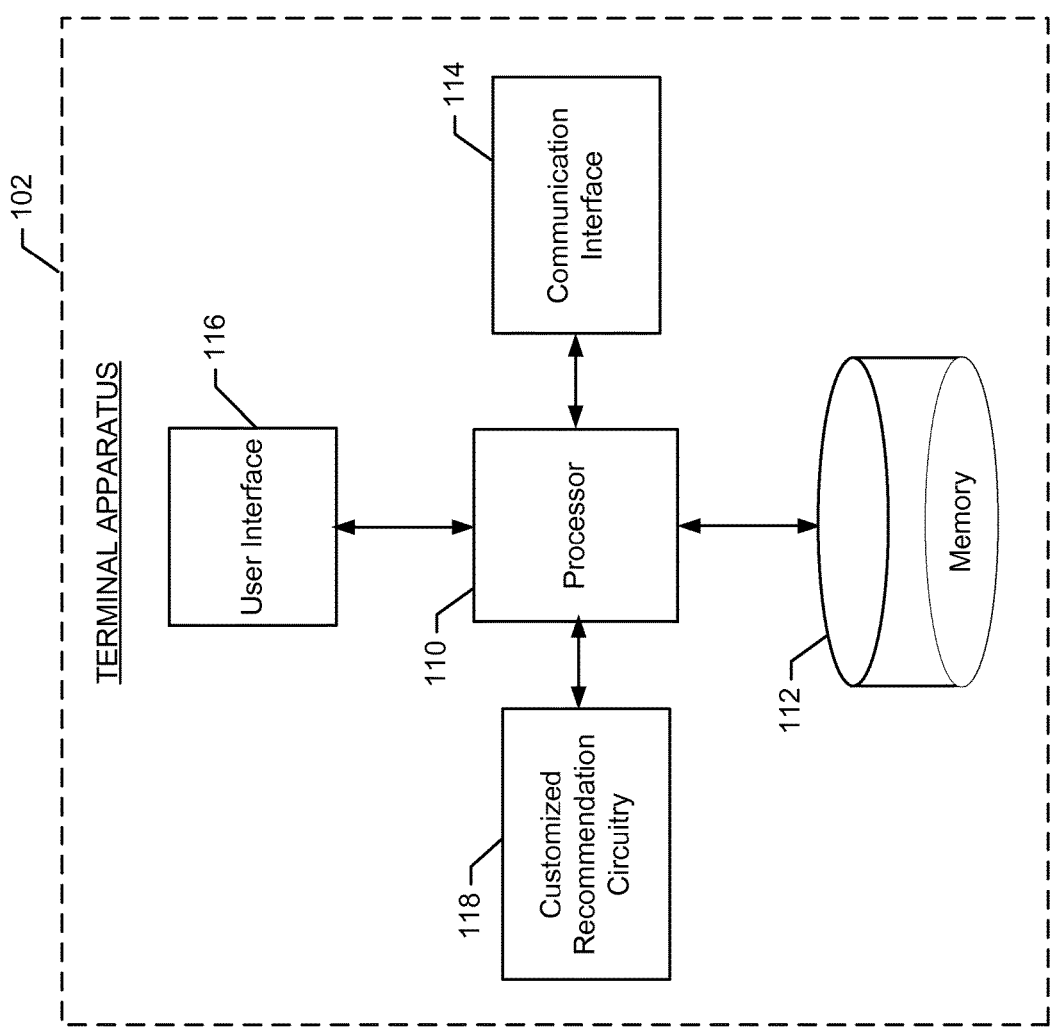
FIG. 2 is a block diagram of a terminal apparatus in accordance with certain embodiments of the present invention.

FIG. 2 provides a block diagram of a terminal apparatus 102 according to an exemplary embodiment of the present invention. In one embodiment, the terminal apparatus 102 may comprise various means for performing the various functions herein described. These means may comprise one or more of a processor 110, memory 112, communication interface 114, user interface 116, or customized recommendation circuitry 118. The means of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 112) that is executable by a suitably configured processing device (e.g., the processor 110), or some combination thereof.

In some exemplary embodiments, one or more of the means illustrated in FIG. 2 may be embodied as a chip or chip set. In other words, the terminal apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or customized recommendation circuitry 118 may be embodied as a chip or chip set. The terminal apparatus 102 may therefore, in some exemplary embodiments, be configured to implement embodiments of the present invention on a single chip or as a single "system on a chip." As another example, in some exemplary embodiments, the terminal apparatus 102 may comprise component(s) configured to implement embodiments of the present invention on a single chip or as a single "system on a chip." As such, in some cases, a chip or chipset may constitute means for performing one or more operations for providing the functionality described herein and/or for enabling user interface navigation with respect to the functions and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 2 as a single processor, in some embodiments the processor 110 may comprise a plurality of processors. The plurality of processors may be in operative communication with each other and may be collectively configured to perform one or more functions of the terminal apparatus 102 as described herein. The plurality of processors may be embodied on a single computing device or distributed across a plurality of computing devices collectively configured to function as the terminal apparatus 102.

In some exemplary embodiments, the processor 110 may be configured to execute instructions stored in the memory 112 or otherwise accessible to the processor 110. These instructions, when executed by the processor 110, may cause the terminal apparatus 102 to perform one or more of the functions of the terminal apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein. For example, the processor 110 may be capable of operating a connectivity program, such as a web browser. The connectivity program may allow the terminal apparatus 102 to transmit and receive web content, according to a protocol, such as hypertext transfer protocol (HTTP) and/or the like. The terminal apparatus 102 may be capable of using a Transmission Control Protocol/Internet Protocol (TCP/IP) to transmit and receive web content across the Internet or other networks. It is understood that the processor 110 may comprise circuitry for implementing audio/video and logic functions of the terminal apparatus 102.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory in removable or fixed form. Although illustrated in FIG. 2 as a single memory, the memory 112 may comprise a plurality of memories. The plurality of memories may be embodied on a single computing device or may be distributed across a plurality of computing devices collectively configured to function as the terminal apparatus 102. In various exemplary embodiments, the memory 112 may comprise a hard disk (for example, magnetic storage devices, floppy disk drives, magnetic tape, etc.), read only memory (ROM), random access memory (RAM) including dynamic and/or static RAM, non-volatile random access memory (NVRAM), on-chip or off-chip cache memory, flash memory, a compact disc read only memory (CD-ROM), digital versatile disc read only memory (DVD-ROM), an optical disc, embedded or removable multimedia memory cards (MMCs), secure digital (SD) memory cards, Memory Sticks, electrically erasable programmable read-only memory (EEPROM), circuitry configured to store information, or some combination thereof.

The memory 112 may be configured to store information, data, applications, instructions, or the like for enabling the terminal apparatus 102 to carry out various functions in accordance with various exemplary embodiments. For example, in some exemplary embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the customized recommendation circuitry 118 during the course of performing its functionality. In some embodiments, the memory may be used to store a basic input/output system (BIOS) containing the basic routines that help to transfer information to the different elements within the terminal apparatus 102.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an exemplary embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the terminal apparatus 102 and one or more computing devices or computing resources may be in communication. As an example, the communication interface 114 may be configured to enable communication between the terminal apparatus 102 and another device, such as another terminal apparatus 102. As a further example, the communication interface 114 may be configured to enable communication with a server apparatus 104 via the network 106. The communication interface 114 may additionally be in communication with the memory 112, user interface 116, and/or customized recommendation circuitry 118, such as via a bus.

The signals sent and received by the communication interface 114 may include signaling information in accordance with an air interface standard of an applicable cellular system, and/or any number of different wireless networking techniques, comprising but not limited to Wi-Fi, wireless local access network (WLAN) techniques such as Bluetooth (BT), Ultra-wideband (UWB), Institute of Electrical and Electronics Engineers (IEEE) 802.11, 802.16, and/or the like. In addition, these signals may include speech data, user generated data, user requested data, and/or the like. In some embodiments, the communication interface 114 of the terminal apparatus 102 may be capable of operating with one or more air interface standards, communication protocols, modulation types, access types, and/or the like. More particularly, the terminal apparatus 102 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the terminal apparatus 102 may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the terminal apparatus 102 may be capable of operating in accordance with 2.5G wireless communication protocols General Packet Radio Service (GPRS), Enhanced Data GSM Environment (EDGE), and/or the like. Further, for example, the terminal apparatus 102 may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The terminal apparatus 102 may be additionally capable of operating in accordance with 3.9G wireless communication protocols such as Long Term Evolution (LTE) or Evolved Universal Terrestrial Radio Access Network (E-UTRAN), IEEE 802.11 (Wi-Fi), 802.16 (WiMAX), and/or the like. Additionally, for example, the terminal apparatus 102 may be capable of operating in accordance with fourth-generation (4G) wireless communication protocols such as LTE Advanced and/or the like as well as similar wireless communication protocols that may be developed in the future.

According to various embodiments, the communication interface 114 of the terminal apparatus 102 may also include one or more components for sharing and/or obtaining data. For example, the communication interface 114 may comprise a short-range radio frequency (RF) transceiver and/or interrogator so data may be shared with and/or obtained from electronic devices in accordance with RF techniques. The communication interface 114 may comprise other short-range transceivers, such as, for example, an infrared (IR) transceiver, a BT transceiver operating using Bluetooth brand wireless technology developed by the Bluetooth Special Interest Group, a wireless universal serial bus (USB) transceiver and/or the like. In this regard, the communication interface 114 and, in particular, the short-range transceiver may be capable of transmitting data to and/or receiving data from electronic devices within a proximity of the terminal apparatus 102, such as within 10 meters, for example.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms, which may be operationally coupled to the processor 110. In this regard, the processor 110 may comprise user interface circuitry configured to control at least some functions of one or more elements of the user interface 116, such as, for example, the speaker, the microphone, the display, and/or the like. The user interface 116, in combination with the processor 110, may be configured to control one or more functions of one or more elements of the user interface 116 through computer program instructions (for example, software and/or firmware) stored on memory 112 accessible to the processor 110 (for example, volatile memory, non-volatile memory, and/or the like). In embodiments in which the user interface 116 comprises a touch screen display, the user interface 116 may additionally be configured to detect and/or receive indication of a touch gesture or other input to the touch screen display. The user interface 116 may be in communication with the memory 112, communication interface 114, and/or customized recommendation circuitry 118, such as via a bus.

The customized recommendation circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In certain instances, as described in greater detail below, the customized recommendation circuitry 118 may be configured to execute a customized recommendation application stored on one or more of the memories 112 on the terminal apparatus 102 to perform various aspects of the claimed invention. In embodiments in which the customized recommendation circuitry 118 is embodied separately from the processor 110, the customized recommendation circuitry 118 may be in communication with the processor 110. The customized recommendation circuitry 118 may further be in communication with one or more of the memory 112, communication interface 114, or user interface 116, such as via a bus.

b. Exemplary Server Apparatus

Figure 3:
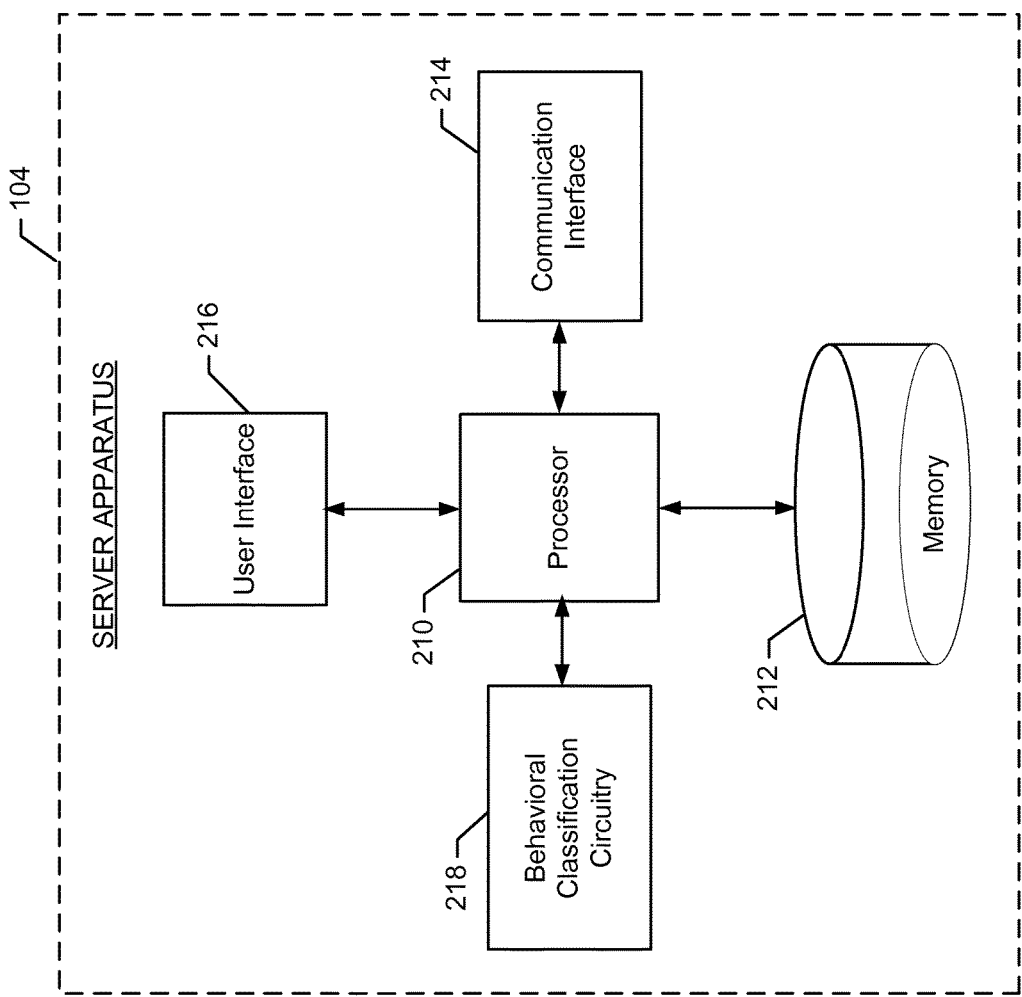
FIG. 3 is a block diagram of a server apparatus in accordance with certain embodiments of the present invention.

FIG. 3 provides a block diagram of a server apparatus 104 according to one embodiment of the present invention. In general, the term "server" may refer to, for example, one or more computers, computing entities, computing devices, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein.

It will be appreciated that one or more of the server apparatus' 104 components may be located remotely from other server apparatus 104 components. Furthermore, one or more of the components may be combined and additional components performing functions described herein may be included in the server apparatus 104. Accordingly, although FIG. 3 illustrates a single server apparatus 104, the functionality of the server apparatus 104 described in the various embodiments below may be performed by a single server apparatus 104, multiple servers 104, or one or more server apparatus 104 operating in cooperation with additional computer or network devices.

In one embodiment, the server apparatus 104 may comprise various means for performing the various functions herein described. These means may comprise one or more of a processor 210, memory 212, communication interface 214, user interface 216, or behavioral classification circuitry 218. The means of the server apparatus 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 212) that is executable by a suitably configured processing device (e.g., processor 210), or some combination thereof.

In some exemplary embodiments, one or more of the means illustrated in FIG. 3 may be embodied as a chip or chip set. In other words, the server apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 210, memory 212, communication interface 214, user interface 216, and/or behavioral classification circuitry 218 may be embodied as a chip or chip set. The server apparatus 104 may therefore, in some exemplary embodiments, be configured to implement embodiments of the present invention on a single chip or as a single "system on a chip." As another example, in some exemplary embodiments, the server apparatus 104 may comprise component(s) configured to implement embodiments of the present invention on a single chip or as a single "system on a chip." As such, in some cases, a chip or chipset may constitute means for performing one or more operations for providing the functions described herein and/or for enabling user interface navigation with respect to the functions and/or services described herein.

The processor 210 may, for example, be embodied as various means including one or more microprocessors with accompanying digital signal processor(s), one or more processor(s) without an accompanying digital signal processor, one or more microprocessors with accompanying digital signal processors, one or more processors without accompanying digital signal processors, one or more coprocessors, one or more multi-core processors, one or more controllers, processing circuitry, one or more computers, various other processing elements including integrated circuits such as, for example, an ASIC or FPGA, one or more other hardware processors, or some combination thereof. Accordingly, although illustrated in FIG. 3 as a single processor, in some embodiments the processor 210 may comprise a plurality of processors. The plurality of processors may be in operative communication with each other and may be collectively configured to perform one or more functions of the server apparatus 104 as described herein. The plurality of processors may be embodied on a single computing device or distributed across a plurality of computing devices collectively configured to function as the server apparatus 104.

In some exemplary embodiments, the processor 210 may be configured to execute instructions stored in the memory 212 or otherwise accessible to the processor 210. These instructions, when executed by the processor 210, may cause the server apparatus 104 to perform one or more of the functions of the server apparatus 104 as described herein. As such, whether configured by hardware or software methods, or by a combination thereof, the processor 210 may comprise an entity capable of performing operations according to embodiments of the present invention while configured accordingly. Thus, for example, when the processor 210 is embodied as an ASIC, FPGA or the like, the processor 210 may comprise specifically configured hardware for conducting one or more operations described herein. Alternatively, as another example, when the processor 210 is embodied as an executor of instructions, such as may be stored in the memory 212, the instructions may specifically configure the processor 210 to perform one or more algorithms and operations described herein. For example, the processor 210 may be capable of operating a connectivity program, such as a web browser. The connectivity program may allow the server apparatus 104 to transmit and receive web content, according to a protocol, such as HTTP and/or the like. The server apparatus 104 may be capable of using a TCP/IP to transmit and receive web content across the Internet or other networks. It is understood that the processor 210 may comprise circuitry for implementing audio/video and logic functions of the server apparatus 104.

The memory 212 may comprise, for example, volatile memory, non-volatile memory, or some combination thereof. In this regard, the memory 212 may comprise one or more tangible and/or non-transitory computer-readable storage media that may include volatile and/or non-volatile memory in removable or fixed form. Although illustrated in FIG. 3 as a single memory, the memory 212 may comprise a plurality of memories. The plurality of memories may be embodied on a single computing device or may be distributed across a plurality of computing devices collectively configured to function as the server apparatus 104. In various exemplary embodiments, the memory 212 may comprise a hard disk (for example, magnetic storage devices, floppy disk drives, magnetic tape, etc.), ROM, RAM including dynamic and/or static RAM, NVRAM, on-chip or off-chip cache memory, flash memory, a CD-ROM, DVD-ROM, an optical disc, embedded or removable MMCs, SD memory cards, Memory Sticks, EEPROM, circuitry configured to store information, or some combination thereof.

The memory 212 may be configured to store executable instructions, information, data, applications, scripts, program modules, or the like for enabling the server apparatus 104 to carry out various functions in accordance with various exemplary embodiments. For example, in some exemplary embodiments, the memory 212 is configured to buffer input data for processing by the processor 210. Additionally or alternatively, the memory 212 may be configured to store program instructions for execution by the processor 210. The memory 212 may store information in the form of static and/or dynamic information. This stored information may be stored and/or used by the behavioral classification circuitry 218 during the course of performing its functions. In some embodiments, the memory may be used to store a basic input/output system (BIOS) containing the basic routines that help to transfer information to the different elements within the server apparatus 104. The executable instructions, applications, scripts, program modules, and/or the like may include an operating system and an insurance incentivizing application. As discussed in greater detail below, the insurance incentivizing application may control certain aspects of the operation of the server apparatus 104 with the assistance of the processor 210 and operating system, although its functionality need not be modularized. In addition to the program modules, the server apparatus 104 may store and/or be in communication with one or more databases, such as database 105.

The communication interface 214 may be embodied as any device or means embodied in circuitry, hardware, a computer program product comprising computer readable program instructions stored on a computer readable medium (e.g., memory 212) and executed by a processing device (e.g., processor 210), or a combination thereof that is configured to receive and/or transmit data from/to another computing device. In an exemplary embodiment, the communication interface 214 may be at least partially embodied as or otherwise controlled by the processor 210. In this regard, the communication interface 214 may be in communication with the processor 210, such as via a bus. The communication interface 214 may include, for example, an antenna, a transmitter, a receiver, a transceiver and/or supporting hardware or software for enabling communications with one or more remote computing devices. The communication interface 214 may be configured to receive and/or transmit data using any protocol that may be used for communications between computing devices. In this regard, the communication interface 214 may be configured to receive and/or transmit data using any protocol that may be used for transmission of data over a wireless network, wireline network, some combination thereof, or the like by which the server apparatus 104 and one or more computing devices or computing resources may be in communication. This communication may be via the same or different wired or wireless networks (or a combination of wired and wireless networks), as discussed above with respect to the terminal apparatus 102. That is, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the server apparatus 104 may be configured to communicate via wireless external communication networks using any of a variety of protocols, such as 802.11, GSM, EDGE, GPRS, UMTS, CDMA2000, WCDMA, TD-SCDMA, LTE, E-UTRAN, Wi-Fi, WiMAX, UWB, and/or any other wireless protocol. As an example, the communication interface 214 may be configured to enable communication between the server apparatus 104 and another device, such as another server apparatus 104. As a further example, the communication interface 214 may be configured to enable communication with a terminal apparatus 102 via the network 106. The communication interface 214 may additionally be in communication with the memory 212, user interface 216, and/or behavioral classification circuitry 218, such as via a bus.

According to various embodiments, the communication interface 214 of the server apparatus 104 may also include one or more components for sharing and/or obtaining data. For example, the communication interface 214 may comprise a short-range RF transceiver and/or interrogator so data may be shared with and/or obtained from electronic devices in accordance with RF techniques. The communication interface 214 may comprise other short-range transceivers, such as, for example, an IR transceiver, a BT transceiver operating using Bluetooth brand wireless technology developed by the Bluetooth Special Interest Group, a wireless USB transceiver and/or the like. In this regard, the communication interface 214 and, in particular, the short-range transceiver may be capable of transmitting data to and/or receiving data from electronic devices within a proximity of the server apparatus 104, such as within 10 meters, for example.

The user interface 216 may be in communication with the processor 210 to receive an indication of a user input and/or to provide an audible, visual, mechanical, or other output to a user. As such, the user interface 216 may include, for example, a keyboard, a mouse, a joystick, a display, a touch screen display, a microphone, a speaker, and/or other input/output mechanisms, which may be operationally coupled to the processor 210. In this regard, the processor 210 may comprise user interface circuitry configured to control at least some functions of one or more elements of the user interface 216, such as, for example, the speaker, the microphone, the display, and/or the like. The user interface 216, in combination with the processor 210, may be configured to control one or more functions of one or more elements of the user interface 216 through computer program instructions (for example, software and/or firmware) stored on memory 212 accessible to the processor 210 (for example, volatile memory, non-volatile memory, and/or the like). In embodiments in which the user interface 216 comprises a touch screen display, the user interface 216 may additionally be configured to detect and/or receive indication of a touch gesture or other input to the touch screen display. The user interface 216 may be in communication with the memory 212, communication interface 214, and/or behavioral classification circuitry 218, such as via a bus.

The behavioral classification circuitry 218 may be embodied as various means, such as circuitry, hardware, a computer program product comprising computer readable program instructions stored on a computer readable medium (for example, the memory 212) and executed by a processing device (for example, the processor 210), or some combination thereof and, in some embodiments, is embodied as or otherwise controlled by the processor 210. In certain instances, as described in greater detail below, the behavioral classification circuitry 218 may be configured to execute a behavioral classification application stored on one or more of the memories 212 on the server apparatus 104 to perform various aspects of the claimed invention. In embodiments in which the behavioral classification circuitry 218 is embodied separately from the processor 210, the behavioral classification circuitry 218 may be in communication with the processor 210. The behavioral classification circuitry 218 may further be in communication with one or more of the memory 212, communication interface 214, or user interface 216, such as via a bus.

III. EXEMPLARY SYSTEM OPERATION

While the various embodiments detailed below are described from the perspectives of one or more terminal apparatus 102 and/or one or more server apparatus 104, it should be understood that the functionality attributed to a particular terminal apparatus 102 or server apparatus 104 may be performed by any, or a combination, of the means associated with the respective terminal apparatus 102 or server apparatus 104. For example, the functionality associated with a terminal apparatus 102 may be performed by the customized recommendation circuitry 118, and the functionality associated with a server apparatus 104 may be performed by the behavioral classification circuitry 218.

According to exemplary embodiments, the terminal apparatus 102 may be configured to determine a plurality of behavioral groups, which may also be referred to as behavioral segments, for classifying one or more insurance agents and/or insurance agency representatives (e.g., insurance agency employees). Each behavioral segment may be associated with one or more characteristics, traits, or behaviors of an insurance representative. The characteristic, trait, or behavior may be associated, in certain embodiments, with a manner in which the insurance agent and/or insurance agency representative (e.g., insurance agency employee) conducts business or handles clients. For example, one behavioral segment may represent insurance agents and/or insurance agency representatives (e.g., insurance agency employees) that rely on a relatively large amount of technology or tools, in particular new technology and tools, to generate business, while another behavioral segment may represent those insurance agents and/or insurance agency representatives (e.g., insurance agency employees) that rely less on novel technology and tools to generate business. In another example, one behavioral segment may represent representatives that focus on growing their client base by adding new customers, while another behavioral segment may represent those representatives that focus on retaining their existing clients. In yet another example, one behavioral group may represent representatives that refer most of their clients to a single insurance carrier or provider, rather than dividing business across many insurance carriers.

The terminal apparatus 102 may determine the plurality of behavioral groups based at least in part on an analysis of data associated with a plurality of insurance agents and/or insurance agency representatives (e.g., insurance agency employees). In this regard, the terminal apparatus 102 may collect data from a plurality of representatives to be used to determine the behavioral groups. In some embodiments, the data may comprise objective data related to recorded behaviors associated with the representatives. For example, the data may indicate the number of new clients added per month, the methods used to communicate with clients (e.g., phone, mail, email, or the like), the number of insurance carriers used, the percentage of clients referred to a particular insurance carrier, and/or the like. In other embodiments, the data collected may comprise subjective data associated with the insurance agents and/or insurance agency representatives (e.g., insurance agency employees). For example, the data may comprise responses to one or more questions posed to the insurance agents and/or insurance agency representatives (e.g., insurance agency employees), such as during an interview. In this example, the terminal apparatus 102 may be configured to conduct the interview, for example, by providing for display of the interview questions and/or recording the responses to the questions (e.g., via the user interface 116). In some embodiments, the data may comprise a combination of objective and subjective data.

The terminal apparatus 102 may analyze the collected data to determine the plurality of behavioral segments. For example, the terminal apparatus 102 may be configured to identify the one or more characteristics, traits, or behaviors that may be used to divide the plurality of insurance agents and/or insurance agency representatives (e.g., insurance agency employees) into the plurality of behavioral segments. In some instances, the plurality of behavioral segments may be predetermined, such as during a previous use of the terminal apparatus 102. For example, the behavioral segments may be determined and/or updated on a periodic basis (e.g., annually, monthly, weekly, daily, etc.) or continuous basis, such that the terminal apparatus 102 may not need to determine the behavioral segments each time the system is used.

According to various embodiments, after the behavioral segments have been determined, the terminal apparatus 102 may be configured to categorize one or more insurance agents and/or insurance agency representatives (e.g., insurance agency employees) into at least one of the plurality of behavioral segments. The categorization may be based on an analysis of collected objective data, subjective data, or a combination of the two associated with the particular insurance representative. In some embodiments, the terminal apparatus 102 may determine a subset of the data described above with respect to determining the behavioral groups that may be used to categorize the representatives. For example, the terminal apparatus 102 may determine a subset of the questions posed to determine the behavioral segments that may be used to categorize the representatives. In this example, the subset of questions may be those determined by the terminal apparatus 102 to have the greatest ability to predict the behavioral segment. The subset of questions may be arranged into a survey or quiz that may be presented to each agent by the terminal apparatus 102 (e.g., via the user interface 116 or a web interface). In some instances, the subset of questions in the survey or quiz may be predetermined, such as during a previous use of the terminal apparatus 102. For example, the subset of questions may be determined and/or updated on a periodic basis (e.g., annually, monthly, weekly, daily, etc.) or continuous basis, such that the terminal apparatus 102 may not need to determine the subset of questions each time the system is used. In exemplary embodiments, the terminal apparatus 102 may be configured to collect the data for categorization, for example, in response to the survey or quiz. The categorization of the representatives may be based on an analysis (e.g., using algorithms) of the collected survey or quiz responses, in some instances, in real time.

In exemplary embodiments, the terminal apparatus 102 may be configured to collect the data for categorizing an insurance agent and/or insurance agency representative (e.g., insurance agency employee) from one or more representatives of the insurance agent. As noted, an insurance representative may be, for example, an insurance agency comprising a plurality of individual insurance agency representatives, an individual insurance agent having one or more individual sub-agents, an individual insurance agent, an individual insurance agency employee, and/or the like. In an embodiment where the insurance agent comprises a plurality of representatives, the terminal apparatus 102 may collect the data from a single representative or multiple representatives of the insurance agent. For example, an insurance agency comprising a plurality of representatives may comprise representatives associated with various positions in the insurance agency (e.g., principal, associate, agent, and/or the like). In some instances, the terminal apparatus 102 may be configured to collect data from at least one representative from each of the various positions or from a particular position (e.g., principal).

According to various embodiments, the terminal apparatus 102 may be configured to collect data associated with an insurance agent and/or insurance agency representative (e.g., insurance agency employee) based on a present state, future state, or both. Data associated with a present state may represent the characteristics, traits, or behaviors of an insurance agent and/or insurance agency representative (e.g., insurance agency employee) at the current time, while data associated with a future state may represent the characteristics, traits, or behaviors that an insurance agent and/or insurance agency representative (e.g., insurance agency employee) would like to have or would like to transition to in the future. In this regard, the terminal apparatus 102 may be configured to request and receive the data separately for the current and future states. For example, in an instance in which the terminal apparatus 102 requests data via a survey or quiz, the terminal apparatus 102 may be configured to receive multiple responses to each question, such as one response related to a current state and one response related to a future state. In another example, the terminal apparatus 102 may be configured to provide a separate survey related to a current state and a future state, in some instances having different questions.

The terminal apparatus 102 may be configured, in certain embodiments, to identify the tools and/or business practices of each of the insurance agents and/or insurance agency representatives (e.g., insurance agency employees). For example, the terminal apparatus 102 may request and receive data from the insurance agent and/or insurance agency representative (e.g., insurance agency employee) or, in some instances, may monitor the behavior of the insurance agent and/or insurance agency representative (e.g., insurance agency employee) to determine the tools and/or business practices employed. In exemplary embodiments, the data obtained by the terminal apparatus 102 while categorizing the insurance agent and/or insurance agency representative (e.g., insurance agency employee) into a behavioral group may be used to identify one or more tools and/or business practices for that particular insurance representative. The tools and/or business practices may comprise, but are not limited to, sequentially-timed offerings, concurrently-timed offerings, packaged offerings, the products offered for sale, the products sold, the insurance carrier programs to which they subscribe (e.g., a premium service package), agency lifecycle stages, product lifecycle, stages, agency goals, geographical offerings, concurrent or sequential Internet advertising, concurrent or sequential television advertising, concurrent or sequential radio advertising, recent or past historical events, insurance carrier affinity, method of delivering quotes, whether annual insurance check-ups are performed, time of the month or year of the sales, concurrent or sequential types of technology used, social media used (e.g., frequency and language used in social media and how it corresponds to the close rate), the methods for communicating with customers (e.g., direct mail, cold calling, automated calling, etc.), the representative's hiring practices (e.g., hires within the community), how the use of the tools and business practices are prioritized over each other, and/or the like.

In various embodiments, the terminal apparatus 102 may be configured to analyze the business results and/or performance of the plurality of insurance agents and/or insurance agency representatives (e.g., insurance agency employees). By analyzing the business results and/or performance of the representatives, the terminal apparatus 102 may be configured to identify one or more insurance representatives as successful. In this regard, the terminal apparatus 102 may identify one or more successful insurance representatives from each of the plurality of behavioral groups. The terminal apparatus 102 may identify successful insurance representatives based at least in part on one or more predetermined criteria for identifying successful insurance representatives. The criteria may consider objective information about the performance of an insurance representative. For example, the criteria may consider the number of new customers added during a certain period of time, the total value of products sold during a particular period, and/or the like. In some instances, the data used to identify whether an insurance representative is successful may comprise quantitative or qualitative data. The data may be maintained by the terminal apparatus 102 for a particular insurance representative or retrieved from an external device, such as a performance database (e.g., database 105).

Once the terminal apparatus 102 identifies the one or more successful insurance representatives, the terminal apparatus 102 may be configured to determine the tools and/or business practices of each of the successful insurance agents and/or insurance agency representatives (e.g., insurance agency employees) from each of the behavioral groups and whether such tools and practices are beneficial to the respective insurance carriers. In this regard, the terminal apparatus 102 may be configured to determine the one or more tools and/or business practices most commonly used by successful insurance representatives in each of the behavioral segments and whether such tools and practices are beneficial to the respective insurance carriers. In some embodiments, the terminal apparatus 102 may determine which tools and/or business practices correlate to the success of the representative. For example, the terminal apparatus 102 may perform an analysis (e.g., a regression analysis) to identify the most commonly used tools and practices used for within each particular behavioral group.

According to various embodiments, the terminal apparatus 102 may be configured to generate a dashboard summary for providing feedback to a particular insurance representative. The dashboard summary may be based at least in part on the behavioral group to which the representative belongs. The dashboard summary may comprise different sections and/or different views related to the current state of the representative and/or the future state of the representative. For example, the terminal apparatus 102 may divide each section of the dashboard summary into a current state portion and a future state portion. In another example, the terminal apparatus 102 may provide a first view for a current state and a second view for a future state. In other embodiments, the terminal apparatus 102 may use the current state information and future state information to generate a dashboard summary related to a path for transitioning from the current state to the future state. In this regard, the dashboard summary may identify practices that assist an insurance representative in the current state to transition over a period of time to the desired future state. The terminal apparatus 102 may provide for display of the transitioning dashboard summary view in place of, or in addition to, the current state and/or future state dashboard summary views.

The terminal apparatus 102 may be configured to provide for display of the dashboard summary to the representative. In this regard, the terminal apparatus 102 may comprise a user interface (e.g., user interface 115) that an insurance representative may use to access the dashboard summary. For example, an insurance agent and/or insurance agency representative (e.g., insurance agency employee) may log in to view the dashboard summary via the user interface. In certain embodiments, the terminal apparatus 102 may be configured to provide for display of the dashboard summary to a third party (e.g., an agent manager) that provides the dashboard summary information to the representative. In some embodiments, the terminal apparatus 102 may determine the dashboard summary information locally, receive the dashboard summary information from an external source (e.g., a server apparatus 104 and/or database 105), or a combination of both.

According to exemplary embodiments, the terminal apparatus 102 may be configured to customize the display of the dashboard summary for a particular insurance representative. In some instances, the terminal apparatus 102 may customize the display for each behavioral segment, such that each agent in a particular behavioral segment receives the same customized display. The terminal apparatus 102 may customize the display by, for example, modifying the layout and/or content of the dashboard summary. For example, the display for a behavioral group associated with agents placing a relatively greater focus on utilizing tools may have the dashboard summary section related to tool recommendation emphasized (e.g., highlighted, displayed at the top, enlarged, etc.). The customized display, in some instances, may modify the promotional or marketing materials displayed to an insurance representative based at least in part on the data collected on the particular insurance representative or the behavioral group to which the representative belongs.

In exemplary embodiments, the dashboard summary may comprise a section related to a comparison of the performance of the insurance agent with other insurance representatives in the same behavioral segment. In this regard, the terminal apparatus 102 may be configured to compile information about the performance of the representative. For example, the performance information may comprise the size of the insurance agent (e.g., number of policies in force, customer base, business volume, premium volume, revenue, and/or the like), the profitability of the representative over a certain period of time, whether the size of the representative and/or profitability of the representative is increasing or decreasing and by how much (e.g., as compared to a previous time period), progress toward and achievement of one or more compensation and/or reward levels (e.g., commission, contingent or discretionary compensation, and/or the like), growth rate, retention rate, loss ratio, quote count, close ratio, and/or other performance metrics. The performance information may be measured with respect to one or more particular insurance carriers or the overall marketplace (i.e., all insurance carriers). The terminal apparatus 102 may maintain the performance information locally, for example, by tracking the performance of the representative over a particular time period. In other embodiments, the terminal apparatus 102 may obtain all or a portion of the performance information from an external source (e.g., a server apparatus 104, database 105, and/or the like). The terminal apparatus 102 may further compile performance information for one or more other insurance representatives in the same behavioral group, for example, as described above with respect to the performance information of the representative.

The terminal apparatus 102 may provide for display of an indication of the performance of the representative and an indication of the performance of other insurance representatives in the same behavioral segment. The performance section of the dashboard summary may further comprise a comparison of the performance of the representative with the other insurance representatives in the behavioral segment. For example, the terminal apparatus 102 may calculate an insurance representative performance value for the other insurance representatives and compare the performance of the representative to the representative performance. For example, the representative performance may be based on a non-zero median or average performance of all or a subset of the other insurance representatives. In another example, the terminal apparatus may identify the percentage of other insurance representatives having a higher or lower performance than the representative. In some embodiments, the terminal apparatus 102 may compare the overall performance of the representative and other insurance representatives, while in other embodiments the terminal apparatus 102 may compare one or more individual performance components of the representative with the respective component for the other insurance representatives. In yet other embodiments, the terminal apparatus 102 may compare the performance of the representative with a subset of the other insurance representatives, such as the one or more other insurance representatives identified as successful.

According to various embodiments, the dashboard summary may comprise a section related to identifying the tools and/or business practices utilized by other insurance representatives in the same behavioral group as the representative. For example, the tools and/or business practices may comprise associations, affiliations, cross-sell techniques, policy packaging, incentives, awards, promotions, discounts, sponsorships, training, bonuses, advertisements (e.g., signage, television, radio, print), sequentially-timed offerings, concurrently-timed offerings, packaged offerings, concurrent or sequential Internet advertising, concurrent or sequential television advertising, concurrent or sequential radio advertising, special events, agency management systems, targeted and/or existing customer profiles (e.g., demographics, preferences, attitudes, risk characteristics, and/or the like), perpetuation planning, underwriting practices, customer contracting practices, premium service subscriptions, agency management systems, comparative raters, online and/or call centers, social media use (e.g., which social media sites (such as Twitter, Facebook, and/or the like) are used, efficacy of social media use, and/or sites correlated to agent success), and/or the like. In this regard, the terminal apparatus 102 may be configured to compile information about the tools and/or business practices used by the representative and the other insurance representatives. For example, the terminal apparatus 102 may collect the tool and/or business practice information as previously described above. The terminal apparatus 102 may be configured to display all or a subset of the tools and/or business practices used by the other insurance representatives in the behavioral segment. In some embodiments, the terminal apparatus 102 may not display those tools and/or business practices currently in use by the representative. The terminal apparatus 102 may also cause display of an indication as or whether such tools and practices are beneficial to the respective insurance carriers.

The displayed tools and/or business practices, in certain instances, may be limited to the tools and/or business practices offered by a particular insurance carrier. For example, the terminal apparatus 102 may display only those tools and/or business practices offered by the insurance carrier associated with the system (i.e., the insurance carrier providing the dashboard summary service). The terminal apparatus 102 may provide an interface (e.g., user interface 115) for selecting one or more of the tools and/or business practices displayed in the dashboard summary. For example, the dashboard summary may comprise a hyperlink associated with each tool or business practice for purchasing or requesting the tool or business practice. In this regard, the terminal apparatus 102 may receive a selection of a tool or business practice (e.g., from the insurance agent), and, in some instances, may provide the tool or business practice or provide the request to an external device or party responsible for providing the tool or business practice.

According to exemplary embodiments, the dashboard summary may comprise a section related to identifying the tools and/or business practices utilized by other insurance representatives in the same behavioral group as the representative that correlate to success and whether such tools and practices are beneficial to the respective insurance carriers. In this regard, the terminal apparatus 102 may be configured to recommend the one or more of the plurality of tools and/or business practices utilized by other insurance representatives in the same behavioral group as the representative that correlate to success. The terminal apparatus 102 may also be configured to indicate whether such tools and practices are beneficial to the respective insurance carriers. For example, the terminal apparatus 102 may be configured to perform a regression analysis to determine which tools and/or business practices utilized by the representatives identified as successful within the behavioral group correlate with those agents'/representatives' success. The recommendations for one or more tools and/or business practices correlated to success, in certain instances, may be updated by the terminal apparatus 102 on a periodic basis (e.g., annually, monthly, weekly, daily, etc.) or continuous basis. In some embodiments, the terminal apparatus 102 may be configured to determine the one or more tools and/or business practices that correlate to success with respect to a particular insurance carrier.

The terminal apparatus 102 may provide for display of the one or more of the plurality of tools and/or business practices utilized by other insurance representatives in the same behavioral group as the representative that correlate to success and whether such tools and practices are beneficial to the respective insurance carriers. According to exemplary embodiments, the terminal apparatus 102 may display one or more performance metrics (e.g., compensation, revenue growth, business volume, and/or the like) likely to be affected by an insurance agent and/or insurance agency representative (e.g., insurance agency employee) implementing the identified tools and/or business practices. In some embodiments, the terminal apparatus 102 may not display those tools and/or business practices currently in use by the representative. In other embodiments, the terminal apparatus 102 may not display any recommended tools and/or business practices in an instance in which the representative is identified as a successful insurance representative.

In certain embodiments, the terminal apparatus 102 may provide for display of one or more additional features in the dashboard summary. For example, the dashboard summary may comprise embedded audio, video, and/or other forms of media. The terminal apparatus 102 may be configured to provide one or more alerts via the dashboard summary. For example, the alerts may indicate new performance metrics, new tools and/or business practices, new recommendations, and/or the like. In some embodiments, the terminal apparatus 102 may be configured to display any or all of the information in the dashboard summary based on the role of the insurance agent (e.g., overall agency, individual agent, manager, principal, associate, customer service representative, and/or the like) or the business model of the insurance agent (e.g., aggregator, cluster, independent, national, regional, online or call center, and/or the like). The terminal apparatus 102 may be configured to provide real time updates to any of the information presented in the dashboard summary.

As will be recognized, with such information now ascertainable, the above may be used by insurance carriers or insurance representatives to inform the design, development, and deployment of future agency tools (such as portals, dashboards, interfaces, quoting tools, and agency management systems). For instance, the terminal apparatus 102 may be configured to provide or provide access to a portal (e.g., dashboard, interface, etc.) that makes accessible various quoting and issuing systems, marketing and sales advice, resources for agency management systems (e.g., desktop or web-based applications for running and managing an agency), and/or various other tools. To do so, in one embodiment, the terminal apparatus 102 may be configured to customize the portal and/or systems, tools, and/or applications provided by or accessible through the portal based on information for the corresponding insurance agencies or representatives and/or their respective customer bases. For example, based upon the agency operating model that a particular insurance agency or insurance representative falls into or the behavioral groups into which the insurance agency or insurance representative is classified, the terminal apparatus 102 may customize the portal (e.g., dashboard, interface, etc.) accordingly. Such customizations may comprise automatically highlighting, making more visible, or dictating the placement of content relevant to the insurance agency or representative in a more conspicuous or user-friendly manner. As will be recognized, the relevant content may include the tools and/or business practices described herein. The relevant content may also include providing for the identification of cross-sell opportunities for certain agencies or representatives, providing for the identification of opportunities for existing renewals, and/or the like. The relevant content may also include informational content on how to make effective use of social media for NextGen agencies or representatives, perform annual insurance check-ups for specific agencies or representatives, be more involved in the community for more traditional agencies or representatives, and/or the like. As will be recognized, such portals and content provided therein or through can be customized to adapt to various needs and circumstances.

As will also be recognized, the above may be used by insurance carriers or insurance representatives to inform the design, development, and deployment of agency compensation strategies (such as commissions, bonuses, incentives). As previously noted, the terminal apparatus 102 may be configured to reference, highlight, or present more conspicuously higher commissions, bonuses, and/or other available incentives to insurance representatives who make use of the tools and/or business practices utilized by other insurance representatives that correlate to success. This may be customized based on particular agencies or representatives and presented through dashboards, portals, and/or the like.

In yet another embodiment, the above may be used by insurance carriers or insurance representatives to sequence, plan, or package business practices. Based on the information ascertained, for example, this may include an insurance carrier or insurance representative running specific concurrent or sequential Internet advertising, running specific concurrent or sequential television advertising, running specific concurrent or sequential radio advertising, and/or the like. This may also include an insurance carrier providing specific sequentially-timed offerings, concurrently-timed offerings, packaged offerings, and/or the like. As will be recognized, this may provide insurance carriers and/or insurance representatives with information to adapt to various needs and circumstances, such as corresponding recommendations being presented through dashboards, portals, and/or the like.

In some instances, a server apparatus 104 and/or a database 105, rather than a terminal apparatus 102, may be configured to perform various functionalities described above with respect to the terminal apparatus 102. For example, a server apparatus 104 may be configured to perform at least one of determining the plurality of behavioral groups, categorizing the one or more insurance representatives into a behavioral group, identifying the tools and/or business practices of the representative and other insurance representatives in the same behavioral group, and identifying one or more successful insurance representatives for each behavioral segment; the terminal apparatus 102 may be configured to generate and display the dashboard summary; and the database 105 may be configured to maintain performance data and tools and/or business practice information related to the one or more insurance representatives in the plurality of behavioral groups.

Figure 4:
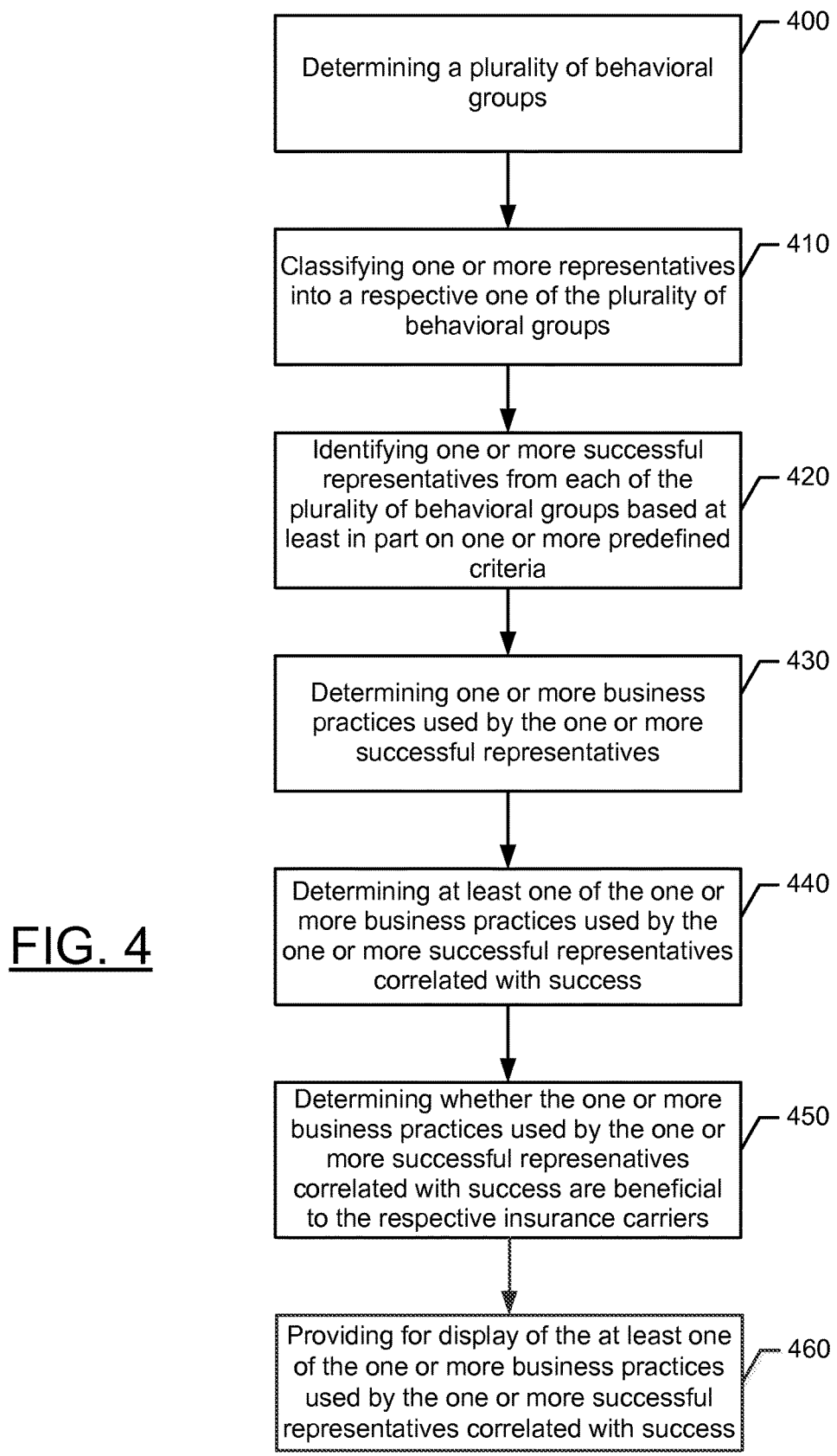
FIG. 4 is a flowchart illustrating operations and processes that can be used in accordance with various embodiments of the present invention.

FIG. 4 illustrates a flowchart according to an example method for implementing secondary networks for cooperative communications with a primary network according to an exemplary embodiment. In this regard, FIG. 4 illustrates operations that may be performed at a terminal apparatus 102. The operations illustrated in and described with respect to FIG. 4 may, for example, be performed by, with the assistance of, and/or under the control of one or more of the processor 110, memory 112, communication interface 114, or customized recommendation circuitry 118. Operation 400 may comprise determining a plurality of behavioral groups. Operation 410 may comprise classifying one or more insurance representatives into at least one of a plurality of behavioral groups. Operation 420 may comprise identifying one or more successful insurance representatives from each of the plurality of behavioral groups based at least in part on one or more predetermined criteria. Operation 430 may comprise determining one or more business practices used by the one or more successful insurance representatives. Operations 440 and 450 may comprise determining at least one of the one or more business practices used by the one or more successful insurance representatives correlated with success and whether such tools and practices are beneficial to the respective insurance carriers. Operation 460 may comprise providing for display of a dashboard summary associated with an insurance representative. The dashboard summary may comprise at least one of a comparison of the performance of the particular insurance representative with the performance of one or more insurance representatives in the same behavioral group as the representative, an indication of one or more business practices used by the one or more insurance representatives in the same behavioral group as the representative, and an indication of the at least one of the one or more business practices used by the one or more successful insurance representatives in the same behavioral group as the representative correlated with success.

FIG. 4 illustrates a flowchart of a system, method, and computer program product according to exemplary embodiments of the invention. It should be understood that one or more of the operations above may be modified or further amplified. Moreover, in some embodiments, certain operations may be considered optional and removed, or additional optional operations may also be included. It should be appreciated that each of the modifications, amplifications, optional additions, or optional removals may be included with the operations above either alone or in combination with any others among the features described herein. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 112 or memory 212) of a mobile terminal, server, or other computing device (e.g., the terminal apparatus 102) and executed by a processor (e.g., the processor 110 or processor 210) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus, device, entity, and/or similar words used herein interchangeably to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some exemplary embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The above described functions may be carried out in many ways. For example, any suitable means for carrying out each of the functions described above may be employed to carry out embodiments of the invention. In one embodiment, a suitably configured processor (for example, the processor 110 and/or processor 210) may provide all or a portion of the elements of embodiments of the invention. In another embodiment, all or a portion of the elements of embodiments of the invention may be configured by and operate under control of a computer program product. The computer program product for performing the methods of embodiments of the invention includes a computer-readable storage medium, such as the non-volatile storage medium (for example, the memory 112 and/or memory 212), and computer-readable program code portions, such as a series of computer instructions, embodied in the computer-readable storage medium.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for generating a customized dashboard comprising a customized layout, the method comprising:
   dividing, via one or more processors, a first set of one or more insurance representatives into a plurality of behavioral groups based at least in part on one or more characteristics, traits, or behaviors of a first set of one or more insurance representatives, wherein the one or more characteristics, traits, or behaviors (a) are associated at least with a manner in which the first set of one or more insurance representatives conduct business or handle clients, and (b) are automatically identified based on analysis of data electronically collected of the first set of one or more insurance representatives;
   classifying, via the one or more processors, a second set of one or more insurance representatives into at least one of the plurality of behavioral groups;
   identifying, via the one or more processors, predetermined criteria indicative of a successful insurance representative;
   identifying, via the one or more processors, a subset of successful insurance representatives from the at least one of the plurality of behavioral groups by applying the predetermined criteria to data associated with the second set of one or more insurance representatives in the at least one of the plurality of behavioral groups;
   identifying, via the one or more processors, one or more computer-based tools used by the subset of successful insurance representatives;
   determining, via the one or more processors, at least one of the one or more computer-based tools used by the subset of successful insurance representatives correlated with success; and
   generating, via the one or more processors, a customized dashboard comprising a customized layout for a particular insurance representative, wherein (i) the customized layout is based at least in part on the behavioral group to which the particular insurance representative belongs and dictates the placement and visibility of the content, (ii) for the particular insurance representative, the customized dashboard is configured to include a split view of current state and future state, and (iii) the content of the customized dashboard comprises (a) an indication of the one or more computer-based tools used by the second set of one or more insurance representatives in the same behavioral group as the particular insurance representative, (b) an indication of the at least one of the one or more computer-based tools used by the subset of successful insurance representatives in the same behavioral group as the particular insurance representative correlated with success, (c) a representation of one or more computer-based tools recommended to the particular insurance representative for the particular insurance representative to transition from the current state to the future state, wherein the one or more computer-based tools recommended to the particular insurance representative are determined based at least in part on data associated with the particular insurance representative and the behavioral group to which the particular insurance representative belongs, and wherein the customized layout places a relatively greater visual emphasis on the representation of the one or more computer-based tools recommended to the particular insurance representative than on other components in the customized dashboard, and (d) the split view of current state and future state, wherein the split view is associated with the one or more computer-based tools recommended to the particular insurance representative.

2. The method of claim 1 further comprising determining the plurality of behavioral groups.

3. The method of claim 1, wherein the customized dashboard further comprises at least one of a comparison of the performance of the particular insurance representative with the performance of the one or more insurance representatives in the same behavioral group as the particular insurance representative.

4. The method of claim 3, wherein the customized dashboard further comprises one or more incentives for the particular insurance representative to use the at least one of the one or more computer-based tools used by the subset of successful insurance representatives correlated with success.

5. The method of claim 1, wherein the customized dashboard further comprises a path for transitioning from the current state of the particular insurance representative to the future state of the particular insurance representative.

6. The method of claim 1 further comprising determining whether the at least one of the one or more computer-based tools used by the subset of successful insurance representatives is beneficial to an insurance carrier.

7. The method of claim 1, wherein the representation of the one or more computer-based tools recommended to the particular insurance representative comprises one or more hyperlinks corresponding to the one or more computer-based tools, wherein each of the hyperlinks is selectable to request its respective computer-based tool.

8. An apparatus comprising at least one processor and at least one memory including computer program code, the at least one memory and the computer program code configured to, with the processor, cause the apparatus to at least:
divide a first set of one or more insurance representatives into a plurality of behavioral groups based at least in part on one or more characteristics, traits, or behaviors of a first set of one or more insurance representatives, wherein the one or more characteristics, traits, or behaviors (a) are associated at least with a manner in which the first set of one or more insurance representatives conduct business or handle clients, and (b) are automatically identified based on analysis of data electronically collected of the first set of one or more insurance representatives;
classify a second set of one or more insurance representatives into at least one of the plurality of behavioral groups;
identify predetermined criteria indicative of a successful insurance representative;
identify a subset of successful insurance representatives from the at least one of the plurality of behavioral groups by applying the predetermined criteria to data associated with the second set of one or more insurance representatives in the at least one of the plurality of behavioral groups;
identify one or more computer-based tools used by the subset of successful insurance representatives;
determine at least one of the one or more computer-based tools used by the subset of successful insurance representatives correlated with success; and
generate a customized dashboard comprising a customized layout for a particular insurance representative, wherein (i) the customized layout is based at least in part on the behavioral group to which the particular insurance representative belongs and dictates the placement and visibility of the content, (ii) for the particular insurance representative, the customized dashboard is configured to include a split view of current state and future state, and (iii) the content of the customized dashboard comprises (a) an indication of the one or more computer-based tools used by the second set of one or more insurance representatives in the same behavioral group as the particular insurance representative, (b) an indication of the at least one of the one or more computer-based tools used by the subset of successful insurance representatives in the same behavioral group as the particular insurance representative correlated with success, (c) a representation of one or more computer-based tools recommended to the particular insurance representative for the particular insurance representative to transition from the current state to the future state, wherein the one or more computer-based tools recommended to the particular insurance representative are determined based at least in part on data associated with the particular insurance representative and the behavioral group to which the particular insurance representative belongs, and wherein the customized layout places a relatively greater visual emphasis on the representation of the one or more computer-based tools recommended to the particular insurance representative than on other components in the customized dashboard, and (d) the split view of current state and future state, wherein the split view is associated with the one or more computer-based tools recommended to the particular insurance representative.

9. The apparatus of claim 8, wherein the memory and computer program code are further configured to, with the processor, cause the apparatus to determine the plurality of behavioral groups.

10. The apparatus of claim 8, wherein the customized dashboard further comprises at least one of a comparison of the performance of the particular insurance representative with the performance of the one or more insurance representatives in the same behavioral group as the particular insurance representative.

11. The apparatus of claim 10, wherein the customized dashboard further comprises one or more incentives for the particular insurance representative to use the at least one of the one or more computer-based tools used by the subset of successful insurance representatives correlated with success.

12. The apparatus of claim 8, wherein the customized dashboard further comprises a path for transitioning from the current state of the particular insurance representative to the future state of the particular insurance representative.

13. The apparatus of claim 8, wherein the memory and computer program code are further configured to, with the processor, cause the apparatus to determine whether the at least one of the one or more computer-based tools used by the subset of successful insurance representatives is beneficial to an insurance carrier.

14. The apparatus of claim 8, wherein the representation of the one or more computer-based tools recommended to the particular insurance representative comprises one or more hyperlinks corresponding to the one or more computer-based tools, wherein each of the hyperlinks is selectable to request its respective computer-based tool.

15. A computer program product comprising at least one non-transitory computer-readable medium bearing computer program code embodied therein for use with a computer is provided, the computer program code comprises:
code for dividing a first set of one or more insurance representatives into a plurality of behavioral groups based at least in part on one or more characteristics, traits, or behaviors of a first set of one or more insurance representatives, wherein the one or more characteristics, traits, or behaviors (a) are associated at least with a manner in which the first set of one or more insurance representatives conduct business or handle clients, and (b) are automatically identified based on analysis of data electronically collected of the first set of one or more insurance representatives;

code for classifying a second set of one or more insurance representatives into at least one of the plurality of behavioral groups;

code for identifying predetermined criteria indicative of a successful insurance representative;

code for identifying a subset of successful insurance representatives from the at least one of the plurality of behavioral groups by applying the predetermined criteria to data associated with the second set of one or more insurance representatives in the at least one of the plurality of behavioral groups;

code for identifying one or more computer-based tools used by the subset of successful insurance representatives;

code for determining at least one of the one or more computer-based tools used by the subset of successful insurance representatives correlated with success; and code for generating a customized dashboard comprising a customized layout for a particular insurance representative, wherein (i) the customized layout is based at least in part on the behavioral group to which the particular insurance representative belongs and dictates the placement and visibility of the content, (ii) for the particular insurance representative, the customized dashboard is configured to include a split view of current state and future state, and (iii) the content of the customized dashboard comprises (a) an indication of the one or more computer-based tools used by the second set of one or more insurance representatives in the same behavioral group as the particular insurance representative, (b) an indication of the at least one of the one or more computer-based tools used by the subset of successful insurance representatives in the same behavioral group as the particular insurance representative correlated with success, (c) a representation of one or more computer-based tools recommended to the particular insurance representative for the particular insurance representative to transition from the current state to the future state, wherein the one or more computer-based tools recommended to the particular insurance representative are determined based at least in part on data associated with the particular insurance representative and the behavioral group to which the particular insurance representative belongs, and wherein the customized layout places a relatively greater visual emphasis on the representation of the one or more computer-based tools recommended to the particular insurance representative than on other components in the customized dashboard, and (d) the split view of current state and future state, wherein the split view is associated with the one or more computer-based tools recommended to the particular insurance representative.

16. The computer program product claim 15 further comprising code for determining the plurality of behavioral groups.

17. The computer program product claim 15, wherein the customized dashboard further comprises at least one of a comparison of the performance of the particular insurance representative with the performance of the one or more insurance representatives in the same behavioral group as the particular insurance representative.

18. The computer program product of claim 17, wherein the customized dashboard further comprises one or more incentives for the particular insurance representative to use the at least one of the one or more computer-based tools used by the subset of successful insurance representatives correlated with success.

19. The computer program product of claim 15, wherein the customized dashboard further comprises a path for transitioning from the current state of the particular insurance representative to the future state of the particular insurance representative.

20. The computer program product of claim 15 further comprising code for determining whether the at least one of the one or more computer-based tools used by the subset of successful insurance representatives is beneficial to an insurance carrier.

21. The computer program product claim 15, wherein the representation of the one or more computer-based tools recommended to the particular insurance representative comprises one or more hyperlinks corresponding to the one or more computer-based tools, wherein each of the hyperlinks is selectable to request its respective computer-based tool.

* * * * *